US010334211B2

(12) United States Patent
Chard

(10) Patent No.: US 10,334,211 B2
(45) Date of Patent: Jun. 25, 2019

(54) OPTICAL HAZARD DETECTION

(71) Applicant: Altec Industries, Inc., Brimingham, AL (US)

(72) Inventor: Joshua T. Chard, Avon, CT (US)

(73) Assignee: Altec Industries, Inc., Birmingham, AL (US)

(*) Notice: Subject to any disclaimer, the term of this patent is extended or adjusted under 35 U.S.C. 154(b) by 36 days.

(21) Appl. No.: 15/358,755

(22) Filed: Nov. 22, 2016

(65) Prior Publication Data
US 2018/0146166 A1 May 24, 2018

(51) Int. Cl.
H04N 7/18 (2006.01)
G06K 9/00 (2006.01)

(52) U.S. Cl.
CPC ......... H04N 7/183 (2013.01); G06K 9/00771 (2013.01)

(58) Field of Classification Search
CPC ..................... H04N 7/183; G06K 9/00771
USPC ........................................................ 348/148
See application file for complete search history.

(56) References Cited

U.S. PATENT DOCUMENTS

| 6,297,744 B1* | 10/2001 | Baillargeon | B66F 17/006 182/14 |
| 8,477,027 B2* | 7/2013 | Givens | B66C 13/44 340/538 |
| 8,953,841 B1* | 2/2015 | Leblang | G06K 9/00671 345/633 |
| 2010/0063627 A1* | 3/2010 | Kitahama | A61H 3/061 700/253 |
| 2011/0298579 A1* | 12/2011 | Hardegger | F16P 3/14 340/3.1 |
| 2013/0116819 A1* | 5/2013 | Ikeda | G06F 17/5009 700/245 |

OTHER PUBLICATIONS

HiVolt Alert™ Proximity Warning System; Atlas Polar Company Limited; Date Printed: Feb. 21, 2017; Date Posted: Unknown; Copyright 2017; <http://www.atlaspolar.com/material-handling-equipment/hivolt-alert.html>.
Home Page: High Voltage Proximity Alarms; Sigalarm; Date Printed: Feb. 21, 2017; Date Posted: Unknown; Copyright 2016; <https://sigalarminc.com>.

* cited by examiner

Primary Examiner — William C Vaughn, Jr.
Assistant Examiner — Jae N Noh
(74) Attorney, Agent, or Firm — Erise IP, P.A.

(57) ABSTRACT

An optical hazard detection system is described that may be used with an aerial device. The optical hazard detection system is utilized for determining a hazard in proximity thereto. The system comprises an optical sensor and a controller. The optical sensor is configured to capture optical images. The controller is configured to acquire the optical images from the optical sensor. The controller is also configured to identify a hazard at least in part from the optical images and to establish a hazard zone to prevent the utility platform from striking the hazard. The hazard zone is within a deployable range for the aerial device.

20 Claims, 5 Drawing Sheets

OPTICAL HAZARD DETECTION

BACKGROUND

1. Field

Embodiments of the invention relate to the detection and avoidance of hazards. More specifically, embodiments of the invention relate to the detection and avoidance of hazards by aerial devices and other heavy machinery.

2. Related Art

Powerlines pose a risk to operators of aerial devices and other elevating equipment. Typically, aerial devices are used to repair and replace power and communication lines. As such, a utility platform of the aerial device may need to move near a powerline. However, if the utility platform strikes the power line, damage to both the utility platform and the power line can result, and (while unlikely) an electrical discharge through the aerial device could result creating hazards for the operator. To prevent such collisions, operators typically must visually identify hazards and not move the utility platform into them.

SUMMARY

Embodiments of the invention address the above-mentioned problems by providing an optical hazard detection system. The optical hazard detection system identifies hazards that are within a deployable range of the aerial device. The optical hazard detection system then prevents (either directly or indirectly by warning the operator) the utility platform from moving to a location that would strike the hazard.

A first embodiment of the invention is directed to an aerial device comprising a base, a boom assembly, a utility platform, and an optical hazard detection system. The boom assembly is pivotably secured at a proximal end to the base. The utility platform is secured to a distal end of the boom assembly. The optical hazard detection system includes an optical sensor configured to capture an optical image, and a controller configured to determine a hazard based at least in part on the optical image. The controller is configured to establish a hazard zone to prevent the utility platform from striking the hazard.

A second embodiment of the invention is directed to an optical hazard detection system for determining a hazard in proximity thereto, the system comprises an optical sensor and a controller. The optical sensor is configured to capture multiple optical images as the boom assembly moves through space. The controller is configured to acquire the optical images from the optical sensor. The controller is also configured to identify the location of a hazard at least in part using triangulation methods from the multiple optical images and to establish a hazard zone to prevent the utility platform from striking the hazard.

A third embodiment of the invention is directed to a computerized method of avoiding a hazard, the method comprising the following steps: acquiring optical images depicting a hazards proximity to a stationary vehicle; determining a hazard based at least in part on the optical image; determining a hazard zone based upon the determined hazard that is within a deployable range of the vehicle, wherein the deployable range is determined by a range of motion that is possible for at least one component of the stationary vehicle.

Another embodiment of the invention may be directed to a non-transitory computer readable medium having a computer program stored thereon. The computer program instructs at least one processing element to perform the above-discussed steps of the computerized method. Yet another embodiment of the invention is directed to an optical sensor configured to be secured to an aerial device. The optical sensor is configured to capture an optical image that is used by a controller of the aerial device to determine hazards.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
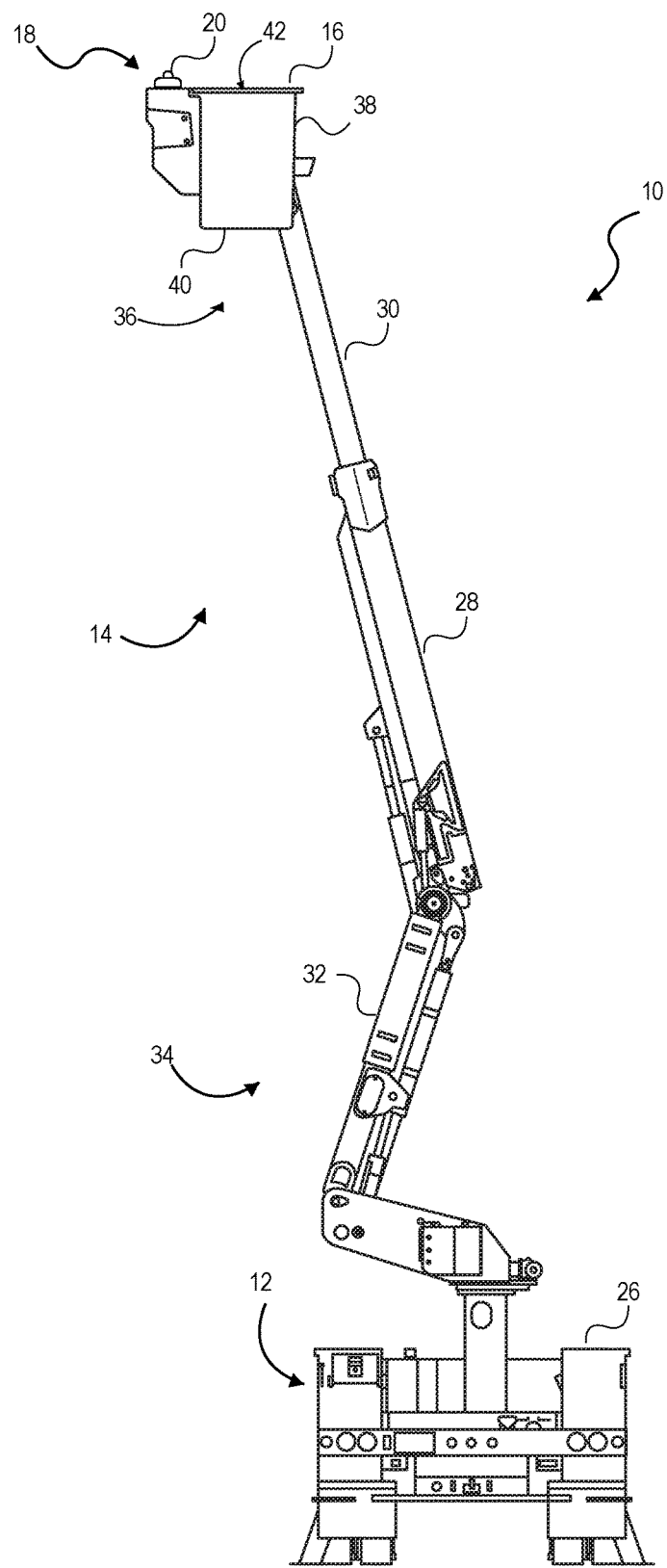
FIG. 1 is a rear view of an aerial device that may utilize an optical hazard detection system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An aerial device 10, constructed in accordance with various embodiments of the invention, is shown in FIG. 1. The aerial device 10 generally comprises a base 12 with a boom assembly 14 rotatably mounted thereto. A utility platform assembly 16 is disposed on the boom assembly 14 to provide an aerial platform for the accomplishment of a task by a utility worker. The aerial device 10 further comprises an optical hazard detection system 18, which includes an optical sensor 20 configured to capture optical images, and a controller 22 configured to determine a hazard 24 based at least in part on the optical images, wherein the controller 22 is configured to establish a hazard zone to prevent the utility platform assembly 16 from striking the hazard 24.

The base 12 of the aerial device 10 is a selectively stabilized platform. In embodiments of the invention, the base 12 is a utility truck 26 (as illustrated in FIG. 1), a crane base, an oilrig, an earth-working machine, or a fixed structure. The base 12 provides stability and a counterweight to a load being supported by the boom assembly 14.

The boom assembly 14 broadly comprises a lower boom section 28 may include an upper boom section 30. boom sections may also be insulated for safety reasons. As illustrated in FIG. 1, some embodiments of the boom assembly 14 may further comprise at least one pivoting boom section 32. The boom assembly 14 presents a proximal end 34 and a distal end 36. The proximal end 34 is rotatably and/or pivotably secured to a portion of the base 12. The distal end 36 is secured to the utility platform assembly 16. In some embodiments, the at least one upper boom section 30 is at least in part disposed within the lower boom section 28. The at least one upper boom section 30 telescopes to extend or retract into the lower boom section 28. In other embodiments, the upper boom section 30 pivots relative to the lower boom section 28, such as illustrated in FIG. 1. The pivoting boom section 32 does not telescope out of any other boom section. Instead the pivoting boom section 32 rotates about the base 12, and the first boom section pivots and/or rotates relative to the pivoting boom section 32. The use of the pivoting boom section 32 allows the utility platform assembly 16 to reach certain areas and avoid obstacles in the working environment.

Figure 5:
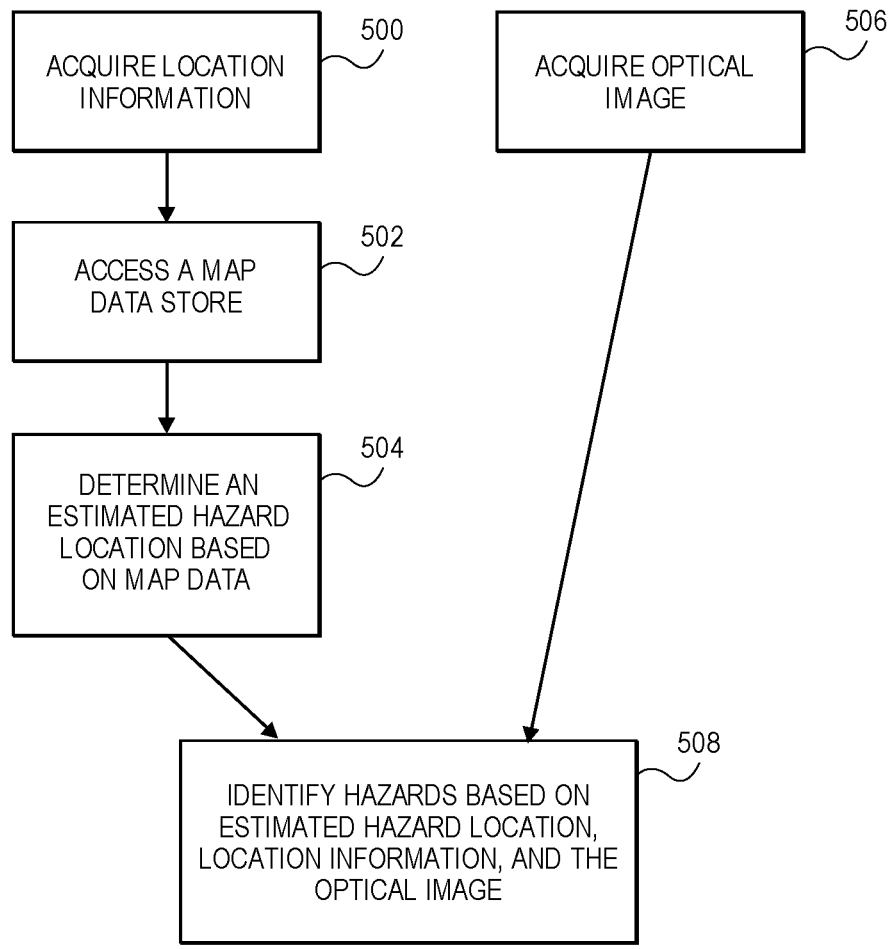
FIG. 5 is a flow diagram illustrating exemplary steps of a method of estimating hazard locations by accessing a map data store.

The utility platform assembly 16 provides an elevated surface from which at least one utility worker can perform a task. As illustrated in FIG. 5, embodiments of the utility platform assembly 16 comprise four bucket sidewalls 38 and a bucket floor 40 that collectively form a cavity 42. The utility platform assembly 16 may also present a bucket lip along a top portion of at least one bucket sidewall 38. The utility platform assembly 16 may further comprise a step and/or a door (not illustrated) in at least one of the bucket sidewalls 38 to allow for ingress and egress of the utility worker. The utility platform assembly 16 may also comprise a handrail (not illustrated).

The four bucket sidewalls 38 and the bucket floor 40 of the utility platform assembly 16 form the cavity 42. The four bucket sidewalls 38 may be unitary, i.e. formed of a single monolithic structure, or they may be coupled together. The transition between successive bucket sidewalls 38, and/or between the bucket sidewalls 38 and the bucket floor 40, may be rounded or arcuate.

In some embodiments, the utility platform assembly 16 presents a horizontal cross-section that is substantially rectangular. Thus, two of the opposing bucket sidewalls 38 may have a greater width than the other two opposing bucket sidewalls 38. In other embodiments, the utility platform assembly 16 presents a horizontal cross-section that is substantially square. Although the dimensions of the utility platform assembly 16 may vary widely, an exemplary small one-worker platform has a horizontal cross-section of approximately 24 inches square (or 576 square inches). A large one-worker platform (also known as a "man-and-a-half" platform) is approximately 24 inches by approximately 30 inches (or 720 square inches). An exemplary platform for two utility workers 18 has a horizontal cross-section of approximately 24 inches by approximately 40 inches (or 1,152 square inches). Each of the exemplary platforms has a height of approximately 42 inches. Other embodiments of the utility platform assembly 16 may be other shapes about the horizontal cross-section, such as an ellipse, a circle, a D-shape, a triangle, a trapezoid, a rhombus, or other quadrilateral.

Figure 2:
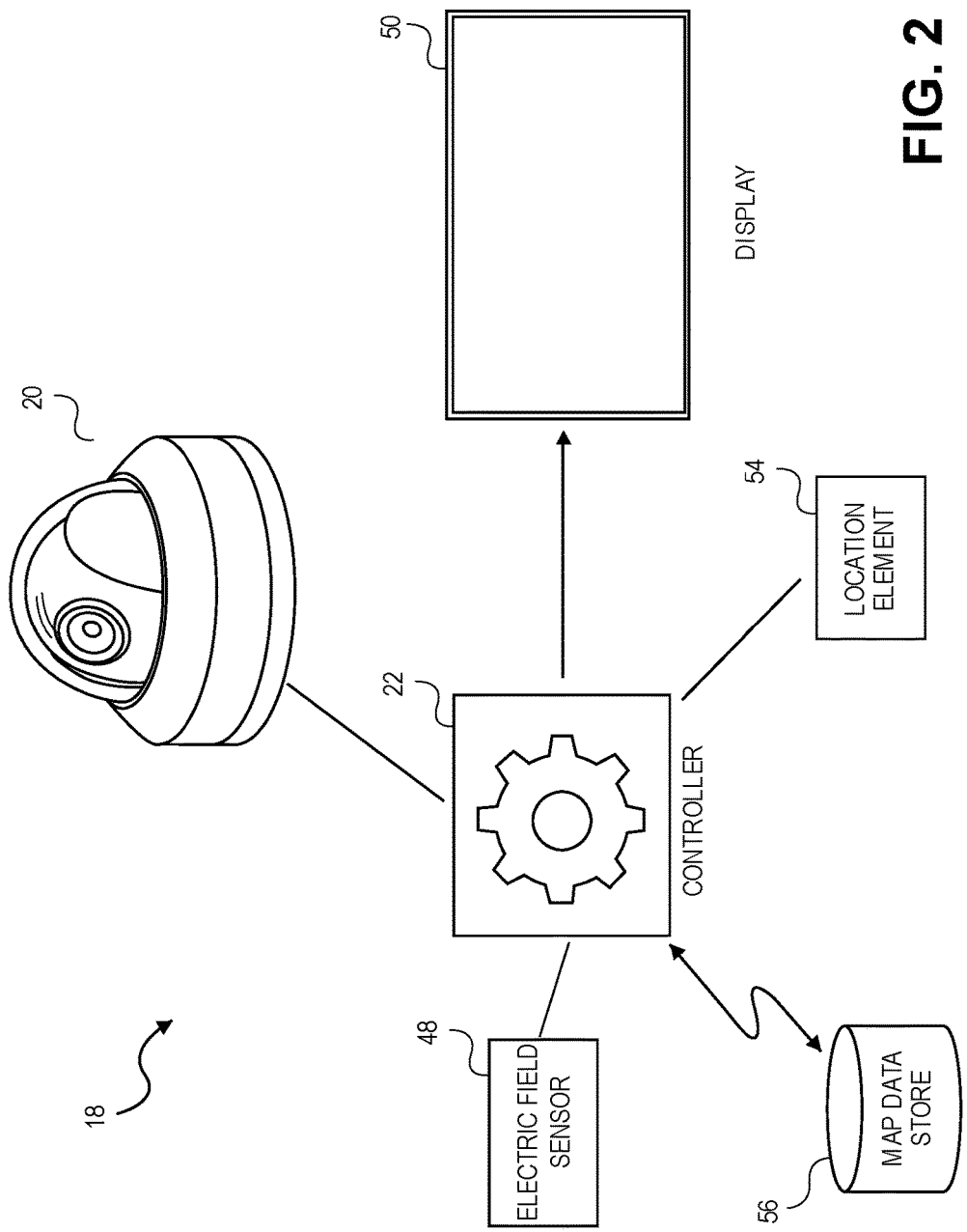
FIG. 2 is a schematic view of various components of the optical hazard detection system.
Figure 3:
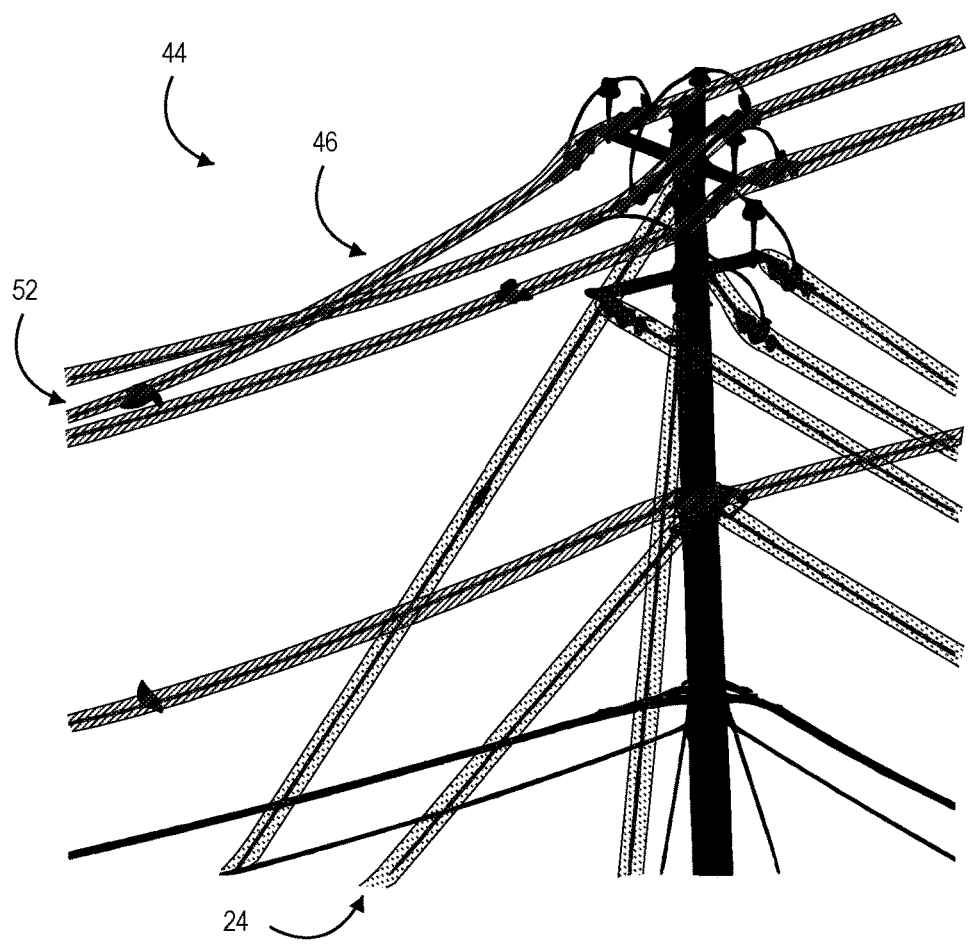
FIG. 3 is a hazard depiction that may be shown on a display to an operator that shows identified hazards.

The optical hazard detection system 18 will now be discussed in greater detail. The optical hazard detection system 18 detects hazards 24 in proximity to the aerial device 10. By detecting the hazards 24, preventative measures can be taken, such as preventing the boom assembly 14 and/or the utility platform assembly 16 from moving to a position that would strike (or likely strike) the hazard 24. In embodiments of the invention, the optical hazard detection system 18 detects hazards 24 that are around and/or above the aerial device 10. This is because the boom assembly 14 will typically extend outward and upward. Embodiments of the invention are configured to be In embodiments of the invention, an optical hazard detection system 18 includes an optical sensor 20 and a controller 22, as illustrated in FIG. 2. The optical sensor 20 is configured to capture an optical image 44 of the proximity thereof. An exemplary optical image 44 is shown in FIG. 3 The controller 22 analyzes the optical images 44 to identify at least one hazard 24 (or potential hazard) in the proximity. Typically, the optical sensor 20 will be utilized while the base 12 of the aerial device 10 is stationary. For example, the outriggers may be deployed and/or the base 12 may be otherwise immobilized, such as by blocking the wheels. The controller 22 is therefore used to identify hazards 24 that are near enough to the base 12 to pose a potential threat to the aerial device 10.

The optical sensor 20 is configured to capture optical images 44. In embodiments of the invention, the light detected is in a range of 380 nm to 800 nm to span the visible spectrum. In other embodiments, the light generated is in a range of 10 nm to 400 nm to span the ultraviolet spectrum or 700 nanometers (nm) to 1 mm to span the infrared spectrum. The optical image 44 includes a horizontal range and a vertical range. The horizontal range is a measure of the horizontal angle relative to the optical sensor 20 which the optical image 44 captures. The vertical range is a measure of the vertical angle relative to the optical sensor 20 which the optical image 44 captures. In some embodiments of the invention, the horizontal range is 360 degrees (e.g., fully perimeter) and the vertical range is at least 90 degrees (e.g., fully from the horizon to vertical) The optical image 44 may therefore be combined to provide a single representation the surroundings of the optical sensor 20.

In embodiments, the optical image 44 depicts an upper hemisphere around the optical sensor 20. The upper hemisphere traverses both fully horizontal and fully vertical, relative to the optical sensor 20. Because the boom assembly 14 and the utility platform assembly 16 typically extend outward and upward from the base 12, hazards 24 to be avoided are typically disposed outward and upward from the base 12. The upper hemisphere therefore depicts hazards 24 that are likely to be struck by the utility platform assembly 16 and/or the boom assembly 14. Hazards 24 along the ground (e.g., below a horizon from the optical sensor 20) may be ignored or not detected.

In some embodiments of the invention, the optical sensor 20 may spin, rotate, and/or pivot. The spinning, rotation, and/or pivoting provides a view wider than the range of view of the respective sensor. In other embodiments, the optical sensor 20 includes a first sensor oriented in a first direction and a second sensor oriented in a second direction. The first sensor and the second sensor each include a respective range of view. The range of view of the first sensor approaches, meets, or overlaps with the range of view of the second sensor. As such the first sensor and the second sensor are configured to capture a wider area than either sensor could capture alone. The step of capturing the optical images 44 may therefore include a step of stitching, adjoining, or otherwise associating a set of sensor-captured images into the optical image 44.

In some embodiments of the invention, the optical sensor 20 is disposed on the utility platform assembly 16, as illustrated in FIG. 1. Disposing the optical sensor 20 on the utility platform assembly 16 allows the optical sensor 20 to detect hazards 24 that are in proximity to the utility platform assembly 16. The optical sensor 20 will therefore travel with the utility platform assembly 16 as the utility platform assembly 16 moves relative to the base 12 (by the articulation of the boom assembly 14). As the optical sensor 20 travels and captures images from different positions the controller 22 can use triangulation and/or other methods to calculate distances to the hazards. However, the view of the hazard 24 may become obstructed by the operator standing in the utility platform assembly 16. As the hazard represented as a powerline is continuous, the controller 22 can extrapolate that the hazard continues through portions that are hidden from view.

In some embodiments of the invention, the optical sensor 20 may be disposed on a set of upper boom controls associated with the platform. In other embodiments of the invention, the optical sensor 20 may be disposed on a sidewall of the utility platform assembly 16, such that the operator is less likely to interfere therewith. In these embodiments, the optical sensor 20 may include a first sensor and a second sensor, wherein the first sensor is disposed on a first sidewall and the second sensor is disposed on a second sidewall. The two respective sensors may then capture an optical image 44 from their respective sidewall that may be stitched together as discussed above.

In other embodiments of the invention, the optical sensor 20 is disposed on the base 12. Disposing the optical sensor 20 on the base 12 of the utility platform assembly 16 may provide a steady, known location for the optical sensor 20. As discussed above, the base 12 is typically stationary during the use of the optical hazard detection system 18. However, the view of the hazard 24 may become obstructed by the aerial device 10 that is articulating relative to the base 12. These embodiments of the invention may therefore detect the hazard 24 prior to deploying the aerial device 10. As such, the optical hazard detection system 18 may determine the hazards 24 in the proximity and set the hazard zones prior to allowing the boom assembly 14 to deploy.

The controller 22 provides processing functionality for the optical hazard detection system 18 and may include any number of processors, micro-controller 22s, or other processing systems, and resident or external memory for storing data and other information accessed or generated by the hazard identification system 100. The controller 22 may execute one or more software programs that implement the techniques and modules described herein. The controller 22 is not limited by the materials from which it is formed or the processing mechanisms employed therein and, as such, may be implemented via semiconductor(s) and/or transistors (e.g., electronic integrated circuits (ICs)), and so forth. It should also be appreciated that the discussed functions and methods performed by the controller 22 may be performed by other processors.

The controller 22 is configured to determine a hazard 24 based at least in part on the optical images 44. The controller 22 may identify a hazard 24 through any of various photo-recognition engines or the like. The controller 22 may identify a hazard 24 by identifying a certain pattern or feature that is indicative of a typical hazard 24. For example, the hazard 24 may be an electrical power line. Electrical power lines typically extend in straight lines that are contrasted against the background. The controller 22 may therefore identify the hazard 24 by identifying straight (or substantially straight, or that are indicative of being substantially straight as the The controller 22 is configured to establish a hazard zone 46 to prevent the utility platform assembly 16 from striking the hazard 24. The hazard zone 46 is an area that is occupied by the hazard 24 and may include adjacent areas around the hazard 24, such as a safe operating distance. For example, the utility platform assembly 16 may need to keep a minimum safe distance from power lines. The hazard zone 46 may therefore include the power line and a radially extending area of the safe operating distance, as illustrated in FIG. 3.

In some embodiments of the invention, the controller 22 is disposed within an optical sensor housing. In these embodiments, the below-discussed steps are performed at or adjacent to the optical sensor 20. The optical hazard detection system 18 may then interact with a control system of the aerial devices 10. The optical hazard detection system 18 may send the information indicative of the hazard 24 and/or information indicative of the hazard zone 46 to the control system of the aerial device 10. In other embodiments, the controller 22 is a component of the control system. In these embodiments, the optical sensor 20 sends the optical image 44 to the control system of the aerial device 10 wherein at least one processor of the control system performs the below-discussed steps.

In embodiments of the invention, the controller 22 is configured to prevent the utility platform assembly 16 from moving into the hazard zone 46. In other embodiments of the invention, the controller 22 is configured to prevent the aerial device 10 from extending to certain lengths, rotating to certain orientations, or pivoting to certain vertical orientations that would bring the utility platform assembly 16 (or other component of the boom assembly 14) into contact with the hazard 24, or within the minimum safe distance.

In embodiments of the invention, the optical hazard detection system 18 further comprises an electrical field sensor 48. The electrical field sensor 48 is configured to detect a presence of an electrical field in proximity to the utility platform assembly 16. The electrical field sensor 48 detects the presence of the electrical field created by current transmitted through the power line or other equipment. While the electrical field sensor 48 can detect the presence of an electrical field, the electrical field sensor 48 of embodiments of the invention may provide an inaccurate and/or incomplete measure of the distance and direction of the power line. This may be due to several factors, such as the voltage of the current running through the power line, the amount and quality of the shielding for the power line, any potential damage to the power line, the presence of other power lines or electrified sources in the proximity, the presence of grounded objects or other obstructions (such as vegetation, tools, and persons) between or near the power line, atmospheric conditions, and other considerations affecting the electrical field.

Therefore, in embodiments of the invention, the optical sensor 20 capturing the optical image 44 may be triggered (either directly or indirectly) by the electrical field sensor 48 detecting an electrical field. In these embodiments, the electrical field sensor(s) 48 may provide information indicative of a distance and direction to the source of the electrical field. The optical sensor 20 may then take an optical image 44 that is directed at least partially toward that distance and direction.

The electrical field sensor 48 is communicatively coupled to the controller 22 and/or the optical sensor 20. The electrical field sensor 48 can therefore provide a trigger for the capture of the optical image 44. In some embodiments, a first optical image 44 may be captured before the boom assembly 14 has deployed to determine locations for the hazards 24. Then, as the boom assembly 14 deploys generally toward the hazards 24, the electrical field sensor 48 may detect the proximity of the power line. Finally, based upon the detected proximity, a second optical image 44 may be captured to determine how close the hazard 24 is to the optical sensor 20 (and by extension to the utility platform assembly 16 and the boom assembly 14). This may provide an updated determination of the respective location of the utility platform assembly 16 and the hazard 24 (as the utility platform assembly 16 is now closer to the hazard 24). In embodiments of the invention, the controller 22 is configured to instruct the optical sensor 20 to capture the optical image 44 upon receiving information indicative of a detected electrical field by the electrical field sensor 48.

In embodiments of the invention, the optical hazard detection system 18 further comprises a display 50. The display 50 is configured to present to the user a hazard depiction including at least a portion of the optical image 44, as illustrated in FIG. 3. The display 50 may be a component of the set of upper boom controls for the utility platform assembly 16, a component of the set of lower boom controls, or may be a separate component that is secured to the aerial device 10 or may be held by the operator.

In embodiments, the display 50 may comprise an LCD (Liquid Crystal Diode) display, a TFT (Thin Film Transistor) LCD display, an LEP (Light Emitting Polymer) or PLED (Polymer Light Emitting Diode) display, an OLED (Organic Light-Emitting Diode), and so forth, configured to display pictures, text, and/or graphical information such as a graphical user interface. The display 50 could also be a three-dimensional display, such as a holographic or semi-holographic display. The display 50 may be backlit via a backlight such that it may be viewed in the dark or other low-light environments, as well as in bright sunlight conditions.

The hazard depiction informs the operator of the hazards 24 in the proximity of the aerial device 10. The hazard depiction may include at least a portion of the optical image 44. The hazard depiction may alternatively or additionally include a rendering of the optical image 44. In embodiments, the hazard depiction includes an overlaid hazard icon 52. The overlaid hazard icon 52 identifies the hazard 24. The display 50 may present the overlaid hazard icon 52 to inform the operator of the presence of the hazard 24 so that the operator can avoid the obstacle (which may be redundant with system controls that will prevent the utility platform assembly 16 and/or boom assembly 14 from moving into the hazard 24) and/or so that the user can confirm that the identified hazard 24 is actually a hazard 24 to be avoided (as discussed below).

The overlaid hazard icon 52 is a graphic, representation, or other illustration based upon the available information for the hazard 24. The overlaid hazard icon 52 therefore provides the operator with the available information about the hazard 24 in an easy-to-read representation. It should be appreciated that, as used herein, "icon" and "graphic" may refer to any graphical representation of the respective information. An "icon" or a "graphic" may include graphics, pictures, photographs, words, numbers, symbols, lines, colors, opacity, cross-hatching, and other fill textures and visual representations of information. The "icon" or "graphic" may also change, alter, update, and delete as new information is obtained. For example, as the utility platform assembly 16 moves relative to the hazard 24, the optical sensor 20 may detect multiple sides of the hazard 24. As such, the size, shape, location, orientation, and other aspects of the overlaid hazard icon 52 may update as this new information is obtained.

In embodiments of the invention, the optical hazard detection system 18 further comprises a user input. The user input is configured to receive an indication from the operator to confirm that the overlaid hazard icon 52 is identifying a hazard 24 to be avoided. The display 50 may be provided with a screen for entry of data and commands. In one or more implementations, the screen comprises a touch screen. For example, the touch screen may be a resistive touch screen, a surface acoustic wave touch screen, a capacitive touch screen, an infrared touch screen, optical imaging touch screens, dispersive signal touch screens, acoustic pulse recognition touch screens, combinations thereof, and the like. Capacitive touch screens may include surface capacitance touch screens, projected capacitance touch screens, mutual capacitance touch screens, and self-capacitance touch screens. The display 50 may therefore present an interactive portion (e.g., a "soft" keyboard, buttons, etc.) on the touch screen for the operator to select certain overlaid hazard icons. In some embodiments, the display 50 may also include physical buttons integrated therewith that may have dedicated and/or multi-purpose functionality, etc. In other embodiments, the display 50 includes a cursor control device (CCD) that utilizes a mouse, rollerball, trackpad, joystick, buttons, or the like to control and interact with the display 50.

In embodiments of the invention, the optical hazard detection system 18 further comprises a location element 54. The location element 54 provides information for a current location for the aerial device 10. As discussed above, the aerial device 10 will typically be stationary during the determination of the hazards 24. For this reason, the location information for the optical hazard detection system 18 may remain generally fixed during the below-discussed steps. The location element 54 may utilize global positioning system (GPS) devices or other location-detecting technology.

Various methods of the invention will now be discussed in greater detail. In embodiments of the invention, a computerized method of avoiding a hazard 24, the method comprising the following steps: acquiring an optical image 44 depicting a proximity to a stationary vehicle, determining a hazard 24 based at least in part on the optical image 44, determining a hazard zone 46 based upon the determined hazard 24 that is within a deployable range of the vehicle, wherein the deployable range is determined by a range of motion that is possible for at least one component of the stationary vehicle. In other embodiments of the invention, a non-transitory computer readable medium has a computer program stored thereon. The computer program instructs at least one processing element to perform the discussed steps.

Figure 4:
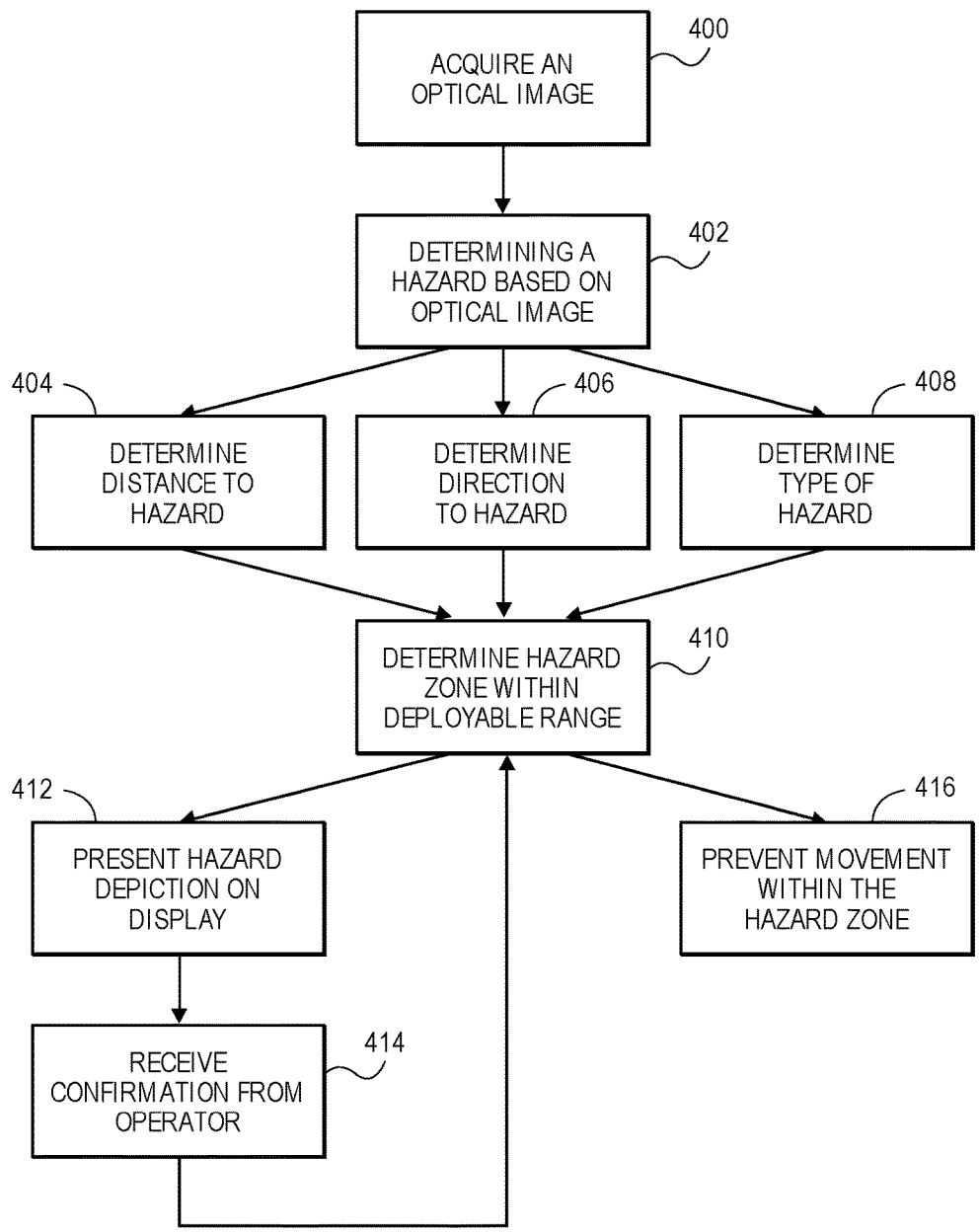
FIG. 4 is a flow diagram illustrating exemplary steps of a method of determining hazards.

Turning to FIG. 4, an exemplary representation of steps of the method are shown. It should be appreciated that, like the other figures shown and discussed, the steps discussed are merely exemplary. The steps may also be performed in any order and steps may be added or deleted.

In Step 400, the controller 22 acquires an optical image 44 depicting a proximity to a stationary vehicle. In some embodiments, the controller 22 may instruct the optical sensor 20 to take or capture the optical image 44. For example, the controller 22 may instruct the optical sensor 20 to take the optical image 44 upon the aerial device 10 beginning to deploy (such as associated with the extension of the outriggers or upon the operator selecting a mode for controlling the aerial device 10). In some embodiments, the controller 22 may also instruct the optical sensor 20 to continue to capture additional optical images at a certain interval or upon certain events (and may additionally perform the following steps upon the receipt of each optical image 44).

In Step 402, the controller 22 determine a hazard 24 based at least in part on the optical image 44. The controller 22 analyzes the optical image 44 to identify at least one interest region. The interest region includes an indication of a hazard 24 therein. For example, a hazard 24 may typically present with a straight line. Hazards 24 to the aerial device 10, such as power lines and buildings include straight lines, while less hazardous objects such as vegetation typically do not include straight lines. The same may be true for other regular shapes. The interest region may also include a color that is unnatural or otherwise indicative of a hazard 24. For example, power lines are typically black or grey. Detection of these colors may therefore be indicative of the hazard 24. Other examples of detected features could include shapes, textures, and the like.

In Step 404 determining an estimated range and an estimated direction from the optical sensor 20 to the hazard 24. Determining the estimated range can be performed by inference, triangulation and/or direct measurement. Inference is determining the distance to an object based upon the size, shape, and orientation of the object in the optical image 44. For example, a utility pole may have a standard diameter and height. Based upon measuring the visible thickness of the utility pole as it appears in the optical image 44, the controller 22 may be able to determine an estimated distance to the utility pole (and, by extension, an estimated distance to the powerlines suspended from the utility pole). As another example, if the optical sensor 20 is substantially level, the distance which the object appears may be determined by the location in which the object meets the ground. Triangulation is a method whereby the sensor acquires multiple images as the optical sensor 20 moves through space. The change in apparent location in the image relative to the location at which the multiple images were captured allows the controller to calculate the relative distance to objects in images.

Direct measurement determines the distance to the object or hazard 24 by using a sensor. The sensor could be a range-finder that utilizes a charged particle beam, an infrared or ultraviolet sensor, or the like. In embodiments, the controller 22 will direct the sensor in the direction of the hazard 24, as determined from the optical image 44. The controller 22 may therefore take direct measurements of the various identified hazards 24 so as to determine a distance to each.

In Step 406, the controller 22 determines a direction to the hazard 24. The direction to the hazard 24 may be measured as a direction, horizontally and vertically, relative to the optical sensor 20. The direction may also be measured relative to another fixed point and direction. For example, the direction may be measures from a pivot center of the boom assembly 14 relative to a forward direction of the aerial device 10. As another example, the direction may be measures from the set of upper boom controls relative to a direction of the boom assembly 14.

In Step 408, the controller 22 determines a type of hazard 24. The type of hazard 24 may be determined for various reasons. The type of hazard 24 may determine, or be associated with, the minimum safe distance for the hazard 24. For example, the utility platform assembly 16 can safely get closer to a building than to a powerline. Determining the type of hazard 24 may also be utilized in determining the distance thereto.

In some embodiments of the invention, the step of determining the type of hazard 24 is conducted by performing a photographic recognition on the optical image 44; comparing the photographic recognition against a set of known hazard 24 types; and determining a hazard 24 type that is associated with the hazard 24 based at least in part on the photographic recognition. The photographic recognition identifies at least one region on the optical image 44 as correlating to a likely hazard 24. For example, in a hazard-free environment, the optical image 44 will typically include mostly a view of the sky. Any hazard 24 above the aerial device 10 will therefore typically contrast against the sky such that the contrast can be identified by the controller 22. The contrasted region may then be compared to the set of known hazard 24 types. The set of known hazard 24 types may include examples of various hazards 24, information indicative of various hazards 24, and other information. The set of known hazard 24 types may include information related to various potential hazards 24 to the utility platform assembly 16 such as power lines, buildings, and trees.

In Step 410, the controller 22 determines a hazard zone 46 based upon the determined hazard 24 that is within a deployable range of the vehicle. Based upon at least one of the distance, the direction, and the type of the hazard 24, the controller 22 determines whether the hazard 24 is a threat to the aerial device 10. If the hazard 24 is a threat, the controller 22 will warn the operator with an audible, visual vibratory or other singular or combination of alarms, or prevent the utility platform assembly 16 and/or the aerial device 10 from striking the hazard 24 through programmed control actions. If the hazard 24 is not a threat, the controller 22 will ignore the hazard 24 and/or monitor the hazard 24 to determine if the hazard 24 may become a threat.

The hazard 24 is a threat if it is within the deployable range. The deployable range is determined by a range of motion that is possible for at least one component of the aerial device 10. The deployable range is typically static for the aerial device 10, based upon the length and possible angles of the various components.

In Step 412, presents, to an operator via a display 50, a hazard depiction including at least a portion of the optical image 44. Like other steps discussed herein, this step is optional. This step may be performed only if the controller 22 has determined that a certainty index for the hazard 24 is below a certain threshold. The controller 22 may then display the identified hazard 24, and may present information as to the lower certainty that the identified region is an actual hazard 24. This step may not be performed in embodiments of the invention that do not include a display 50. For example, the display 50 may be located at a set of lower boom controls. The operator may then select and confirm hazards 24 while at the set of lower boom controls but not while the operator is within the utility platform assembly 16 at the set of upper boom controls. The hazard depiction includes an overlaid hazard icon 52 identifying the hazard 24. The overlaid hazard icon 52 may include a designation as to the type, the distance, and/or the direction of the hazard 24. The overlaid hazard icon 52 may also include information indicative of how the operator can avoid the obstacle.

In Step 414, the controller 22 invites the operator to confirm that the overlaid hazard icon 52 is identifying a hazard 24 to be avoided. The invitation may include presentation of a button or input location for the operator to select. The invitation may additionally or alternatively allow the operator to select the overlaid hazard icon 52 to indicate that is a hazard 24, or deselect the overlaid hazard icon 52 to indicate that it is not a hazard 24.

In Step 416, the controller 22 provides an operator warning and/or prevents the boom assembly 14 from striking the hazard 24. In some embodiments this includes allowing the operator to control the movement of the boom assembly 14 to any location that is not within a hazard zone 46. In some embodiments, the controller 22 will apply a break to a certain component of the boom assembly 14 and/or the utility platform assembly 16 if the certain component is entering or adjacent to the hazard zone 46. In some embodiments, the controller 22 will override the commands from the operator and dump any hydraulic fluid back to the tank of the hydraulic system.

FIG. 5 is a flow diagram illustrating exemplary steps of a method of estimating hazard locations by accessing a map data store 56 acquiring a location indication for the stationary vehicle. The steps illustrated in FIG. 5 may be performed in addition to the steps performed in FIG. 4. Additionally, the steps of FIG. 5 may be performed once for the aerial device 10 in a certain location. The steps of FIG. 4 may be performed for each iteration of determining the hazard 24. For example, the steps of FIG. 4 may be performed periodically, such as once per second, or upon a triggering event, such as a moving of the aerial device 10.

In Step 500, the controller 22 acquires location information for the aerial device 10. The location information may be acquired from a location element 54 such as a global positioning system (GPS) device. The location information is indicative of the current location of the aerial device 10.

In Step 502, the controller 22 accesses a set of hazard information associated with the location indication from a map data store 56. The map data store 56 may be remote from the controller 22 or associated with the controller 22. For example, the map data store 56 may be associated with an external mapping source, such as GOOGLE MAPS. As another example, the map data store 56 may be associated with an internal mapping source, such as the map data associated with the location element 54.

In Step 504, the controller 22 determines an estimated hazard location based upon the set of hazard information and the location information. The estimated hazard location may be based upon hazards 24 that appear in the map data store 56. For example, information regarding the location of power lines, utility poles, and buildings may appear in the map data. As another example, the controller 22 may acquire images taken from the location that are associated with the map data store 56. The controller 22 may perform a photographic analysis on these images to determine if there are likely hazards 24.

In Step 506, the controller 22 acquires the optical image 44, as described above with regard to Step 400. The optical image 44 may then be compared to the map data and/or images acquired from the map data store 56. In Step 508, the controller 22 identifies hazards 24, based at least in part on the estimated hazard location, the location information, and the optical image 44. The system may then perform the above-mentioned step of identifying the hazards 24 based at least in part on the estimated hazard location.

It should be appreciated that, while the above disclosure has been generally directed to the field of aerial devices 10, embodiments of the invention may be directed to other fields and uses. For example, embodiments of the invention may be used in stationary cranes, antennas, digger derricks, and other equipment that lifts off the ground from a stationary or selectively stationary location.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An aerial device comprising:
a base;
a boom assembly pivotably secured at a proximal end to the base and configured to be deployed;
a utility platform secured to a distal end of the boom assembly; and
an optical hazard detection system, including—
an optical sensor configured to capture an optical image;
a controller configured to determine a hazard based at least in part on the optical image,
wherein the controller is configured to establish a hazard zone to prevent the utility platform from striking the hazard,
wherein the controller is configured to prevent deploying of the boom assembly until the hazard zone is determined,
wherein orientations of the boom assembly are limited to prevent the boom assembly from entering the hazard zone.

2. The aerial device of claim 1, wherein the optical sensor is disposed on the utility platform.

3. The aerial device of claim 1, wherein the optical sensor is disposed on the base.

4. The aerial device of claim 1, wherein the controller is disposed within an optical sensor housing.

5. The aerial device of claim 1, wherein the controller is configured to prevent the utility platform from moving into the hazard zone.

6. The aerial device of claim 1, further comprising:
an electrical field sensor configured to detect a presence of an electrical field in proximity to the utility platform,
wherein the electrical field sensor is communicatively coupled to the controller,
wherein the controller is configured to instruct the optical sensor to capture the optical image upon receiving information indicative of a detected electrical field by the electrical field sensor.

7. The aerial device of claim 1, further comprising:
a display configured to present to the user a hazard depiction including at least a portion of the optical image,
wherein the hazard depiction includes an overlaid hazard icon identifying the hazard; and
a user input configured to receive an indication from the operator to confirm that the overlaid hazard icon is identifying a hazard to be avoided,
wherein the hazard is included in the hazard zone only if the user confirms.

8. An optical hazard detection system for determining a hazard in proximity thereto, the system comprising:
an optical sensor configured to capture an optical image;
a controller configured to acquire the optical image from the optical sensor,
said controller configured to identify a hazard at least in part from the optical image,
said controller configured to establish a hazard zone to prevent a utility platform assembly from striking the hazard,
wherein the utility platform assembly is configured to deploy relative to a base that is stationary,
wherein the controller is configured to prevent deploying of the utility platform assembly until the hazard zone is determined,
wherein orientations of the boom assembly are limited to prevent the boom assembly from entering the hazard zone.

9. The optical hazard detection system of claim 8, wherein the controller is disposed within an optical sensor housing.

10. The optical hazard detection system of claim 8,
wherein the optical sensor is configured to be disposed on the utility platform of an aerial device,
wherein the optical sensor is configured to detect hazards that are within a range of motion of the utility platform relative to the base of the aerial device.

11. The optical hazard detection system of claim 10,
wherein the controller is configured to determine if the hazard zone is within a range of motion,
wherein the controller is configured to prevent the utility platform from moving into the hazard zone,
wherein the controller is configured to warn the operator with an alarm prior to the utility platform from moving into the hazard zone.

12. The optical hazard detection system of claim 8, further comprising:
an electrical field sensor configured to detect a presence of an electrical field in proximity to a utility platform,
wherein the electrical field sensor is communicatively coupled to the controller,
wherein the controller is configured to instruct the optical sensor to capture the optical image upon receiving information indicative of a detected electrical field by the electrical field sensor.

13. The optical hazard detection system of claim 8, further comprising:
a display configured to present to the user a hazard depiction including at least a portion of the optical image,
wherein the hazard depiction includes an overlaid hazard icon identifying the hazard; and
a user input configured to receive an indication from the operator to confirm that the overlaid hazard icon is identifying a hazard to be avoided.

14. The optical hazard detection system of claim 8,
wherein the optical sensor is configured to detect hazards around and above the optical sensor,
wherein the optical image depicts a full perimeter around the optical sensor,
wherein the optical image depicts an upper hemisphere around the optical sensor,
wherein the upper hemisphere traverses horizontal and fully vertical.

15. A computerized method of avoiding a hazard, the method comprising the following steps:
acquiring an optical image depicting a proximity to a stationary vehicle,
determining a hazard based at least in part on the optical image,
determining a hazard zone based upon the determined hazard that is within a deployable range of the vehicle,
wherein the deployable range is determined by a range of motion that is possible for at least one component of the stationary vehicle,
preventing movement of said at least one component until the hazard zone is determined,
limiting orientations of the boom assembly to prevent the boom assembly from entering the hazard zone.

16. The computerized method of claim 15, further comprising the following step:
determining an estimated range and an estimated direction from the optical sensor to the hazard; and
comparing the estimated range to the deployable range of the vehicle,
wherein the hazard is ignored if the estimated range exceeds the deployable range.

17. The computerized method of claim 15, further comprising the following steps:
acquiring a location indication for the stationary vehicle;
accessing a set of hazard information associated with the location indication from a map data store;
determining an estimated hazard location based upon the set of hazard information and the location information,
wherein the step of determining the hazard is based at least in part on the estimated hazard location.

18. The computerized method of claim 15, further comprising the following steps:
presenting, to an operator via a display, a hazard depiction including at least a portion of the optical image,
wherein the hazard depiction includes an overlaid hazard icon identifying the hazard; and
inviting the operator to confirm that the overlaid hazard icon is identifying a hazard to be avoided.

19. The computerized method of claim 15, further comprising the following step:
performing a photographic recognition on the optical image;
comparing the photographic recognition against a set of known hazard types; and
determining a hazard type that is associated with the hazard based at least in part on the photographic recognition.

20. The computerized method of claim 19, wherein the set of known hazard types includes power lines, buildings, and trees.

* * * * *